United States Patent [19]

Morohoshi

[11] Patent Number: 4,632,839
[45] Date of Patent: Dec. 30, 1986

[54] PROCESS FOR MANUFACTURING SOYMILK PRODUCTS WITH WHEAT GERMS

[75] Inventor: Yozo Morohoshi, Hiratsuka, Japan

[73] Assignee: Hidekatsu Kuroyanagi, Kanagawa, Japan

[21] Appl. No.: 762,283

[22] Filed: Aug. 5, 1985

[30] Foreign Application Priority Data

Sep. 3, 1984 [JP] Japan .................................. 59-183987
Nov. 14, 1984 [JP] Japan .................................. 59-239688

[51] Int. Cl.⁴ .............................................. A23L 1/20
[52] U.S. Cl. ..................................... 426/573; 426/589; 426/489; 426/656; 426/634
[58] Field of Search ................. 426/656, 634, 489, 46, 426/579, 589, 573

[56] References Cited

U.S. PATENT DOCUMENTS 4,105,803 8/1978 Peng ....................................... 426/634
4,427,710 1/1984 Terada et al. ......................... 426/634
4,514,433 4/1985 Matsuura .............................. 426/634

FOREIGN PATENT DOCUMENTS 2745221 4/1978 Fed. Rep. of Germany ...... 426/634
58-52044 3/1983 Japan .
0014756 1/1984 Japan .................................. 426/634
0030659 2/1985 Japan .................................. 426/634

Primary Examiner—Jeanette Hunter
Attorney, Agent, or Firm—Oblon, Fisher, Spivak, McClelland & Maier

[57] ABSTRACT

A process for manufacturing soybean milk products with wheat germs, which entails mixing a dispersion of wheat germs with soy dispersion by setting the mixing ratio of wheat germs in wheat germ dispersion at about 1–150 parts by weight to about 100 parts by weight of soybeans in the soy dispersion; heating the mixture to a temperature sufficient to remove the odor of the wheat germs; and coagulating the mixture by adding nigari or an artificial coagulant, after the mixture has been boiled in a steam cooker and filtered.

13 Claims, No Drawings

PROCESS FOR MANUFACTURING SOYMILK PRODUCTS WITH WHEAT GERMS

BACKGROUND OF THE INVENTION

1. Field of the Invention

The present invention relates to a process for manufacturing soymilk products with wheat germs.

2. Description of the Background

Typical products of soymilk are tofu and soybean curd. Such food substances as well as processes for making them are generally well-known. The tofu or soybean curd is generally plain in its taste but rich in flavor and nutritious value with digestible phytalbumin. In recent years, therefore, such substances have become more popular with the recognition of their nutritious value, even as a diet food, in addition to their widespread use in traditional cuisine. However, the tofu made from soybeans is not necessarily pleasant tasting depending on the manner of cooking or eating. Hence, there is a great need to improve the qualities of tofu as a food substance. According to a traditional way of producing tofu, nigari or natural bittern is used to coagulate soymilk for the final product. Nigari or natural bittern has a pronounced ability to effect coagulation, and reacts instantaneously when it is mixed with the soymilk. Moreover, the process of manufacturing tofu requires the use of extremely difficult techniques. Further, the product tends to be inconsistent in texture, and given the lack of sufficient time for product maturation, the taste is often not pleasant tasting.

Nigari or natural bittern is magnesium chloride, a natural coagulant, which is a by-product obtained from salt farms in the process of making salt. Additionally, an artifical coagulant may also be used, such as calcium sulfate or glucono-δ-lactone, which reacts slowly and permits easier processing of tofu or soybean curd. However, the final product thus obtained is quite inferior in taste compared to the one processed with nigari or natural bittern.

Thus, a need continue to exist for a process for manufacturing soymilk products of superior taste which does not utilize difficult techniques and which is relatively simple in operation.

SUMMARY OF THE INVENTION

Accordingly, it is an object of the present invention to provide a process for manufacturing soymilk products of superior taste which does not utilize difficult techniques and which is relatively simple in operation.

It is also an object of this invention to provide a stock for fried soybean curd having a superior taste.

Further, it is an object of the present invention to provide a tofu or soybean curd having a superior taste.

According to the present invention the foregoing and other objects are attained by providing a process for manufacturing soybean milk products with wheat germs which entails mixing a wheat germ dispersion with a soy dispersion, with a mixing ratio in the range of about 1 to 150 parts by weight of the wheat germ in the dispersion to about 100 parts by weight of soybean in the soy dispersion; heating the mixture to inactivate the oxidizing enzyme or enzymes in the dispersion, thereby removing the odor of wheat germ; and coagulating the mixture by adding nigari, or an artificial coagulant.

DETAILED DESCRIPTION OF THE PREFERRED EMBODIMENTS

The present invention entails a process for manufacturing soymilk products with wheat germ. In more detail, the process of the present invention involves mixing soy dispersion with a dispersion of wheat germ, heating the mixture to inactivate the oxidizing enzyme or enzymes in the dispersion, and coagulating the mixture to produce various soymilk products which are prepared by varying the ratios of soybeans and wheat germ in the mixture.

Soymilk products made solely from soybeans have a limited repertoire of tastes. Thus, in order to obtain soymilk products of better taste, the original taste must be enhanced by emphasizing the unique flavor of soymilk itself. According to the present invention, it has been found that a dispersion of wheat germ when added to the soy dispersion appears to function by controlling the speed of coagulation of the nigari or natural bittern so that the mixture of soymilk and wheat germ dispersions will have sufficient time to mature into a delicious soymilk product of even texture.

According to the present invention, it is also now possible to prepare a stock for fried soybean curd having superior taste by setting the mixing ratios between the soymilk and wheat germ dispersion. It is also now possible to prepare a tofu or soybeam curd of superior taste. Moreover, a new soymilk product is also provided which is as tasty as tofu, but much softer and can be advantageously served as a pudding for dessert. Further, an additional new soymilk product is provided by increasing the amount of wheat germ dispersion in the mixture and processing the product in a form similar to oatmeal. This product can be used as a dressing or a substitute for yogurt.

Additionally, according to the present invention, the malodorous smell inherent to the wheat germ, which adversely affects the flavor of the final products, can be eliminated by heating the wheat germ to be mixed into the mixture to a temperature of about 95° C. or more. In so doing, the flavor of the final products is not affected.

In practicing the present method, a dispersion of wheat germs obtainable by homogenizing wheat germs is mixed with a soy dispersion obtainable by homogenizing soybeans. The wheat germs to be used can be either fresh or processed wheat germs. The processed wheat germs include heated germs, finely ground germs and wheat germ milk. From the standpoint of flavoring, the fresh wheat germs are the best ingredient for the mixing. There are slight differences as will now be described in the present process depending on the type of the wheat germs, fresh or processed to be used.

(1) Fresh wheat germs:
  (a) The fresh wheat germs are dispersed in hot water of 95° C. or more, and homogenized by a homogenizer using heated steam of 95° C. or more which is blown into the homogenizing part thereof, or
  (b) The fresh wheat germs and hot water of 95° C. or more are allowed to flow into the homogenizing part of a homogenizer simultaneously and then the wheat germs are homogenized in the highly heated water to form a disperion, or
  (c) The fresh wheat germs are heated with hot water of 95° C. or more, and this high-temperature dispersion is homogenized to effect dispersion, or (d) The fresh wheat germs and soybeans are mixed and homogenized to form a homogenized mixture. This mixed dispersion is then heated to 95° C. or more for use.

(2) Processed wheat germs:
 (a) When heated wheat germs are used, the process will be the same as in the case of the fresh wheat germs as above.
 (b) When finely ground wheat germs are used, the process will be the same as (a) as above.
 (c) When wheat germ milk is used, it must be adjusted to be in the same range of concentration at the same temperature as that of the soymilk which has been obtained by filtering the boiled soy dispersion for removal of its crude fibers and other particles contained therein.

In all cases as above, by heating the wheat germs, fresh and processed alike, with hot water or steam of 95° C. or more, the "haiga shu" or "the smell inherent to wheat germ" can be eliminated so that the flavor and taste of the finished products will effectively be enhanced.

The dispersion of wheat germs thus obtained can be mixed with the soy dispersion for the production of various types of soymilk products. The following is the process flow of each case:

(1)-(a):
Wheat germs→dispersion in hot water→homogenizing in heat steam—dispersion Soybeans→crushing→soy dispersion→mixing→boiling→filtering-→coagulating→soymilk products.

(1)-(b):
Wheat germs→homogenizing in hot water→ Soybeans→homogenizing→soy dispersion→mixing-→boiling→filtering→coagulating→soymilk products.

(1)-(c):
Wheat germs→dispersion in hot water→homogenizing Soybeans→homogenizing→soy dispersion→mixing-→boiling→filtering→coagulating→soymilk products.

(1)-(d):
Wheat germs→Soybeans→mixing→homogenizing-→mixed dispersion→boiling→filtering-→coagulating→soymilk products.

(2)-(c):
Wheat germ milk→heating and concentration adjustment Soybeans→homogenizing→boiling→filtering-→mixing→coagulating→soymilk products.

According to the present process, an amount of about 1 to 150 parts by weight of wheat germs in dispersion or the wheat germ milk is mixed with about 100 parts by weight of the soybeans in the soy dispersion, and the mixture is coagulated with a coagulant such as calcium sulfate or the like or with nigari, i.e., natural bittern. By mixing the two dispersions, coagulation is controlled as the coagulant works with the soy dispersion but not with the dispersion of wheat germ. The mixture is then allowed to mature into a delicious soymilk product during a sufficient period of time provided by the prolonged coagulation. Also, the taste of wheat germ is similar to that of the soy milk coagulated with nigari or natural bittern. As a result the wheat germ will complement the taste of the coagulated soymilk to permit the unique flavor of soymilk to be enhanced. Thus, the final products will be rich in taste and flavor.

As has already been noted, there are two different kinds of coagulants, artificial and natural. Nigari or natural bittern is an effective natural coagulant in this process, but with the soy dispersion it effects an extremely severe coagulation and tends to work too quickly to carry out an even coagulation. Also, the period of time available for product maturation is insufficient. If these difficulties could be overcome to permit an effective and appropriate coagulation by nigari or natural bittern, the taste of the final product would have the excellent flavor and taste normally obtained by using nigari or natural bittern. In contrast to the nigari or natural bittern, the artificial coagulant works comparatively slowly, and with it, a sufficient coagulation is easily carried out. However, the taste of the final product thus obtained is quite inferior to that of products processed with nigari or natural bittern. In fact, the taste of the product obtained with nigari or natural bittern is incomparably better.

According to the present process, even with nigari or natural bittern which is an ideal coagulant for the soymilk products, the mixing of the dispersion of wheat germs will eventually control the speed of coagulation to allow an even and sufficient coagulation to allow for the production of delicious diet foods. Also, when using the aritifical coagulant, the dispersion of wheat germs mixed will further control the coagulation, providing a much longer period of time for the final product to mature. The coagulation will be carried out gradually over the soymilk, thus allowing the carbohydrates, which are abundant in the wheat germ, to complement the unique taste of soymilk for a delicious, flavorful product to be produced. Hence, the taste of the products thus obtained is no longer inferior to the good taste of the soymilk processed with nigari or natural bittern.

According to the present process, the amount of wheat germ in the dispersion or in the wheat germ milk is about 1 to 150 parts per about 100 parts by weight of the soybeans in the soy dispersion. The precise mixing ratio may be selected as described below to produce various unique soymilk products.

The present invention will now be further illustrated by certain examples and references which are provided for purposes of illustration only and are not intended to limit the present invention.

EXAMPLE 1

The mixing ratio between the amount of wheat germs in dispersion relative to the amount of soybeans in the soy dispersion is set at approximately 1 to 10 against 100, respectively. In this case, the amount of wheat germs is comparatively small so that it will be relatively ineffective in complementing the unique flavor of the soymilk coagulated in the mixture. However, it is still much better than the conventional product processed without this process. The final product thus obtained in this aspect of the present invention, having the mixing ratio in the abovementioned range, is a stock of excellent quality for deep-fried tofu or soybean curd or the like.

In this particular process, the wheat germs normally ground are less effective. Therefore, they must be finely ground to improve the effectiveness of the dispersion.

EXAMPLE 2

The mixing ratio between the amount of wheat germ in its dispersion against the amount of soybeans in the soy dispersion is set at approximately 11 to 50 against 100 respectively. In this case, the normal homogenizing of wheat germs will suffice. The more the amount of wheat germs is increased, the more delicious will become the taste of the final product. The process using this ratio range is most suitable for the production of tofu or soybean curd. The tofu thus obtained is so delicious that there is no comparison in taste between the tofu produced in the present process and one which is conventionally produced. Moreover, the present process can be carried out with far less difficulty than the conventional processes.

EXAMPLE 3

The mixing ratio between the amount of wheat germs in the wheat germ dispersion against the amount of soybeans in the soy dispersion is set at approximately 51 to 100 per 100, respectively. The normal homogenizing of wheat germs may be used. The slower the rate of coagulation, the softer the texture of the final product produced, and a delicious soymilk product can be obtained. The product is new and most suitable as a dessert and is similar to a pudding.

EXAMPLE 4

The mixing ratio between the amount of wheat germs in dispersion against the amount of soybeans in the soy dispersion is set at approximately 101 to 150 per 100, respectively. The normal homogenizing of wheat germs may be used. Since the dispersion of wheat germs contains more wheat germ than soy dispersion does soybeans, the coagulation will no longer ensue, and the product has no value as a soy-milk product.

As has already been noted, according to the present process, the unique taste of the soymilk products represented by the tofu or soybean curd will become richer by mixing the dispersion of wheat germ with the soy dispersion because the mixed wheat germ dispersion does not participate in coagulation but rather functions to control it, allowing the carbohydrates contained abundantly in the wheat germ to complement the unique flavor of soymilk for the production of flavorful, delicious soymilk products.

As a result, for even a comparatively small amount of wheat germ applied, the unique flavor of soymilk can be enhanced, and the product thus obtained is usable as an excellent stock for a delicious deep-fried tofu or soybean curd or the like. Also, this process, wherein the coagulation of soymilk is controlled by mixing therewith the dispersion of wheat germs, will make it possible to produce, even with an artificial coagulant, a tofu or soybean curd which is equally tasty to the tofu or soybean curd processed with nigari or natural bittern, or to easily produce nigari tofu (or soybean curd processed with nigari or natural bittern), which would otherwise require quite difficult techniques. The present process provides for a prolonged coagulation which enables the mixture of wheat germs and soybean dispersion to mature sufficiently with the abundant carbohydrates in the wheat germ complementing and ultimately enhancing the unique flavor and taste of soymilk for the production of delicious tofu or soybean curd. Furthermore, by setting the amount of wheat germs in its dispersion at 51 to 100 per the amount of soybeans in the soy dispersion, designated as 100, a delicious soymilk product similar to a pudding, and useful as a dessert, will be produced. Likewise, by setting the ratio at 101 to 150 per 100, a delicious, flavorful soymilk product similar to a dressing and useful as a substitute for yogurt will be produced.

All the products thus obtained are high in nutritious value with digestible phytalbumin and are also delicious and flavorful. The foods are also so-called natural foods and can be quite simply produced by the present process.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for manufacturing soybean milk products with wheat germs, which comprises:
    (a) mixing a dispersion of wheat germs with a soy dispersion, wherein the mixing ratio of wheat germs in the wheat germ dispersion and soybeans in the soy dispersion is 1 to 150 parts by weight to about 100 parts by weight, to produce a mixture;
    (b) heating said mixture to a temperature sufficient to remove the odor of the wheat germs;
    (c) boiling said mixture in a steam cooker;
    (d) filtering said mixture, and
    (e) coagulating the mixture by adding nigari or an arificial coagulant.

2. The process as in claim 1, wherein said artificial coagulant is calcium sulfate or glucono-δ-lactone.

3. The process as in claim 1, wherein said mixture is heated to a temperature of a least 95° C.

4. The process as in claim 1, wherein a dispersion of wheat germs is mixed with soy dispersion in a mixing ratio of about 1 to 10 parts by weight of wheat germ in the wheat germ dispersion to about 100 parts by weight of soybeans in the soy dispersion, to produce a stock for deep-fried tofu or soybean curd.

5. The process as in claim 1, wherein a dispersion of wheat germs is mixed with soy dispersion in a mixing ratio of about 11–50 parts by weight of wheat germ in the wheat germ dispersion to about 100 parts by weight of soybeans in the soy dispersion, to produce a tofu or soybean curd of superior taste.

6. The process as in claim 1, wherein a solution of wheat germs is mixed with soy solution in a mixing ratio of about 51–100 parts by weight of wheat germ in the wheat germ solution to about 100 parts by weight of soybeans in the soy solution, to produce a dessert pudding.

7. The process as in claim 1, wherein a dispersion of wheat germs is mixed with soy dispersion in a mixing ratio of about 101–150 parts by weight of wheat germ in the wheat germ dispersion to about 100 parts by weight of soybeans in the soy dispersion, to produce a dressing or yogurt substitute.

8. The process as in claim 6, wherein the concentration of said dispersion of wheat germ is approximately the same as the concentration of the soy dispersion.

9. The process of claim 1, wherein the wheat germs used in said wheat germ dispersion are fresh wheat germs or processed wheat germs selected from the group consisting of heated wheat germs, finely ground wheat germs or wheat germ milk.

10. A stock for deep-fried tofu or soybean curd produced by the process of claim 4.

11. A tofu or soybean curd produced by the process of claim 5.

12. A dessert pudding produced by the process of claim 6.

13. A dressing or yogurt substitute produced by the process of claim 6.

* * * * *